United States Patent [19]

Ugaki et al.

[11] Patent Number: 5,153,714
[45] Date of Patent: Oct. 6, 1992

[54] CIRCUIT FOR REMOVING JITTER OF CHROMINANCE SIGNAL AND TELEVISION SET USING THE SAME

[75] Inventors: Hidehiro Ugaki, Daito; Yoshichika Hirao, Neyagawa; Nobukazu Hosoya, Nara, all of Japan

[73] Assignee: Sanyo Electric Co., Ltd., Osaka, Japan

[21] Appl. No.: 590,830

[22] Filed: Oct. 1, 1990

[30] Foreign Application Priority Data

Oct. 3, 1989 [JP] Japan .................. 1-259337

[51] Int. Cl.[5] .................. H04N 5/95; H04N 9/89
[52] U.S. Cl. .................. 358/31; 358/21 R; 358/20; 358/326
[58] Field of Search .................. 358/21, 31, 315, 316, 358/319, 317, 322, 323, 324, 326, 330, 20, 19, 17, 30, 26

[56] References Cited

U.S. PATENT DOCUMENTS

| | | | |
|---|---|---|---|
| 3,619,491 | 11/1971 | Fujita | 358/326 |
| 3,733,432 | 5/1973 | Arimura et al. | 358/326 |
| 3,974,520 | 9/1976 | Kuroyanagi | 358/326 |
| 4,157,565 | 6/1979 | Kuniyoshi et al. | 358/326 |
| 4,208,674 | 6/1980 | Kuniyoshi et al. | 358/326 |
| 4,209,800 | 6/1980 | Yamamitsu | 358/317 |

FOREIGN PATENT DOCUMENTS

62-183292  8/1987  Japan .

Primary Examiner—James J. Groody
Assistant Examiner—Glenton B. Burgess
Attorney, Agent, or Firm—Armstrong, Nikaido, Marmelstein, Kubovcik & Murray

[57] ABSTRACT

A frequency of a chrominance signal including a jitter component and separated from a color video signal is converted from a first frequency to a second frequency by first frequency converting device. Then, the chrominance signal which frequency is converted to the second frequency is converted to have the original frequency by second frequency converting device. Each of the first frequency converting device and the second frequency converting device includes a multiplier and a bandpass filter. One multiplier of the first and the second frequency converting devices and receives a frequency signal corresponding to a phase difference between a reference frequency signal and a color burst signal separated from the chrominance signal. As a result, the jitter component is removed from the chrominance signal either in the first or the second frequency converting. In the first and the second frequency converting devices and, the input signal and the output signal so widely differ from each other in frequency that the respective frequency components included in the output signal of the multipliers in the respective frequency converting device expend widely along an axis of a frequency. As a result, the bandpass filter in each frequency converting device is enabled to easily extract only a signal of a desired frequency component.

14 Claims, 8 Drawing Sheets

CIRCUIT FOR REMOVING JITTER OF CHROMINANCE SIGNAL AND TELEVISION SET USING THE SAME

BACKGROUND OF THE INVENTION

1. Field of the Invention

The present invention relates generally to a circuit for removing jitter of a chrominance signal, and more particularly, to a circuit for removing a jitter component from a chrominance signal included in a color video signal.

2. Description of the Background Art

Figures 1, 2:
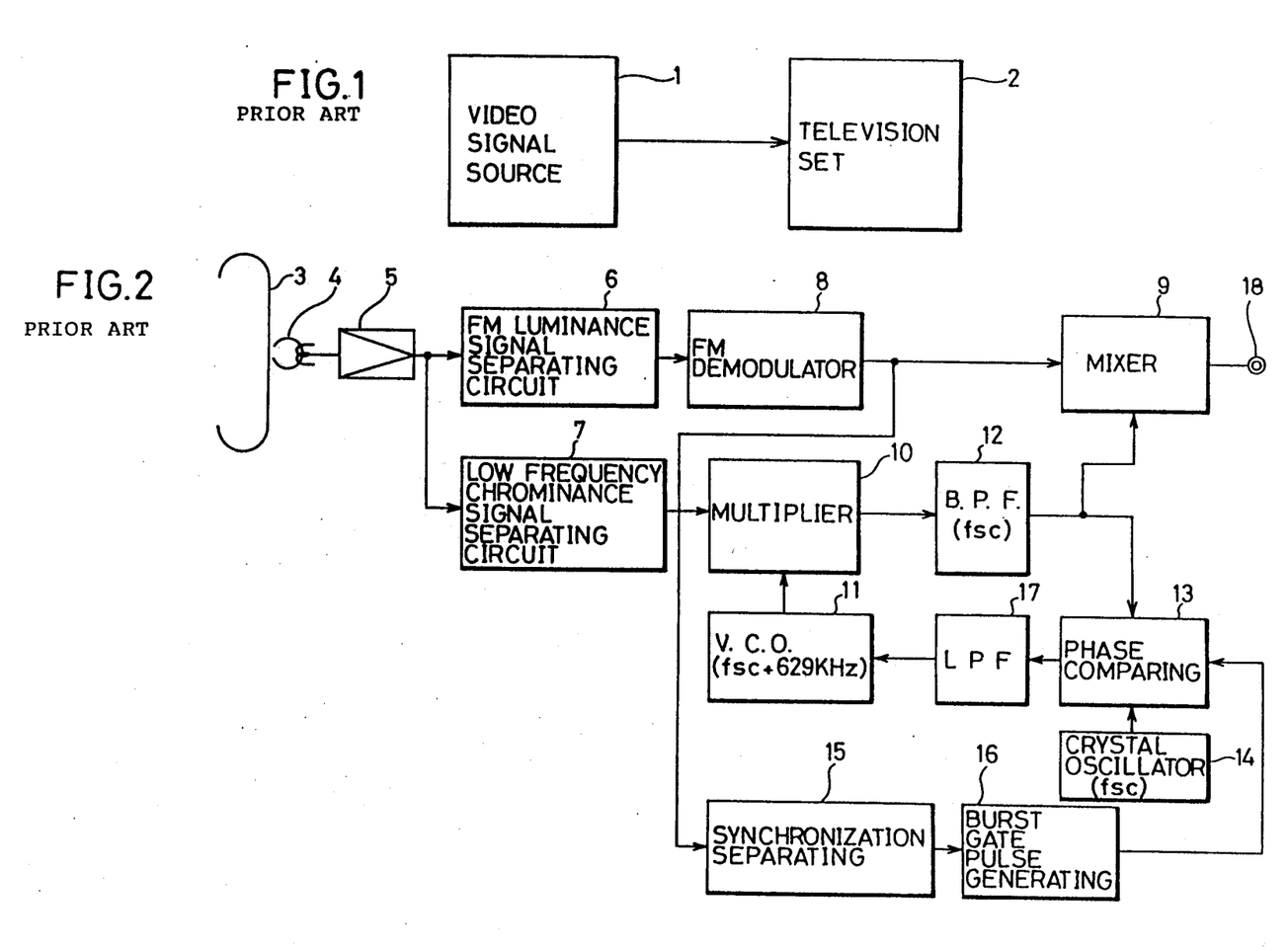
FIG. 1 is a schematic block diagram showing an arrangement of a conventional video system.
FIG. 2 is a schematic block diagram showing a reproduction system of a conventional video tape recorder containing a jitter removing circuit.

As shown in FIG. 1, a video system is conventionally well-known in which video signals output from a video signal source 1 such as a video tape recorder or a laser disk player are applied to a television set 2 wherein the video signals are displayed on a CRT screen. In such a video system, fluctuation in time is caused in the video signals reproduced by the video signal source 1 due to various causes such as irregular rotation of a disk motor and vibration of a magnetic tape in travelling. Such fluctuation in time of a video signal is referred to as "jitter", which has various adverse effects on the picture displayed in the television set 2. Particularly, the jitter components included in chrominance signals results in uneven color of the display picture to make the display frame extremely unclear.

Therefore, various measures have been conventionally adapted to remove jitter components from chrominance signals in the video signal source 1.

FIG. 2 is a block diagram showing a schematic arrangement of a reproduced signal system of a conventional video tape recorder. Generally, a video tape recorder is provided with a frequency converting circuit for converting a low frequency chrominance signal reproduced from a magnetic tape to a chrominance subcarrier frequency adaptable to a television set. The video tape recorder shown in FIG. 2 is provided with a jitter removing circuit for removing jitter component from chrominance signals by using a frequency conversion function of this frequency converting circuit.

In FIG. 2, a video signal reproduced from a magnetic tape 3 by a magnetic head 4 is amplified by an amplifier 5 and then applied to an FM luminance signal separating circuit 6 and a low frequency chrominance signal separating circuit 7. The FM luminance signal separating circuit 6 separates frequency-modulated luminance signal components included in the reproduced video signal and applies the same to an FM demodulator 8. The FM demodulator 8 demodulates the frequency-modulated luminance signal and applies the demodulated luminance signal to one input of a mixer 9. Meanwhile, the low frequency chrominance signal separating circuit 7 separates a low frequency chrominance signal from the reproduced video signal and applies the same to one input end of a multiplier 10. An output signal of a voltage controlling oscillator (hereinafter referred to as VCO) 11 is applied to the other input end of the multiplier 10. The multiplier 10 multiplies the low frequency chrominance signal separated by the low frequency chrominance signal separating circuit 7 and the output signal of the VCO 11 together and applies the multiplied signal to a bandpass filter 12. A pass band of the bandpass filter 12 is selected to have a center frequency set to a chrominance subcarrier frequency fsc. The chrominance signal band-width-limited by the bandpass filter 12 is applied to the other input end of the mixer 9 and one input end of a phase comparator 13. An output signal of a crystal oscillator 14 is applied to the other input end of the phase comparator 13. An oscillating frequency of the crystal oscillator 14 is set to a chrominance subcarrier frequency fsc. The output of the FM modulator 8 is applied also to a synchronization separating circuit 15. The synchronization separating circuit 15 separates a horizontal synchronizing signal from the output of the FM demodulator 8, that is, the demodulated luminance signal and applies the same to a burst gate pulse generating circuit 16. The burst gate pulse generating circuit 16 generates a burst gate pulse defining a period of a color burst signal in a chrominance signal by delaying the horizontal synchronizing signal applied from the synchronization separating circuit 15 and applies the same to the phase comparator 13. The phase comparator 13 compares phases of the output signal of the bandpass filter 12 and the output signal of the crystal oscillator 14 only in a period the color burst signal is included, using the burst gate pulse applied from the burst gate pulse generating circuit 16 as a timing signal. The output of the phase comparator 13 is applied to the VCO 11 through a low-pass filter 17. An oscillating frequency of the VCO 11 fluctuates, centered at fsc+629 Khz (629 Khz is a frequency of a low frequency chrominance signal), in response to the output voltage of the low-pass filter 17.

In the video tape recorder having the above-described arrangement shown in FIG. 2, the multiplier 10 multiplies the low frequency chrominance signal of 629 KHz and the output signal of the VCO 11 having a frequency of fsc+629 KHz, so that chrominance signal component having fsc is included in the output signal of the multiplier 10. The chrominance signal component of fsc is extracted by the bandpass filter 12. Accordingly, the frequency of the chrominance signal separated from the video signal is converted from 629 KHz to fsc. The chrominance signal output from the bandpass filter 12 is mixed with the luminance signal demodulated by the FM demodulator 8 in the mixer 9 to be output from an output terminal 18. Meanwhile the phase comparator 13 compares phases of the color burst signal included in the chrominance signal output from the bandpass filter 12 and a reference frequency signal of fsc output from the crystal oscillator 14 and generates a control voltage corresponding to the phase difference. The control voltage is applied through the low-pass filter 17 to the VCO 11, wherein a voltage value of the control voltage fluctuates in response to the jitter component included in the chrominance signal. Accordingly, the oscillating frequency of the VCO 11 also fluctuates in response to the jitter component included in the chrominance signal. Therefore, the jitter components in the chrominance signal is canceled in the multiplier 10, so that the jitter component is removed from the chrominance signal.

Figure 3:
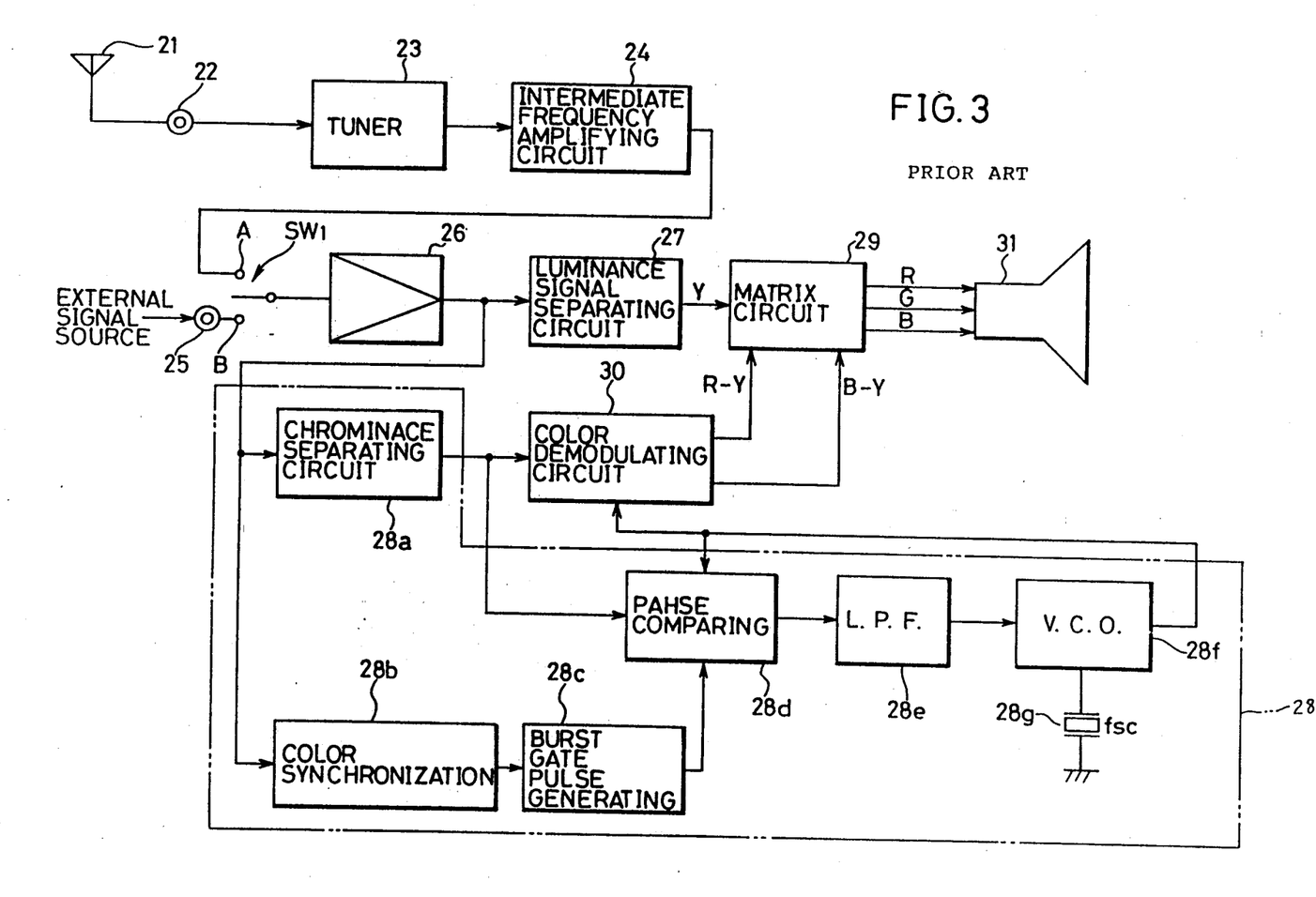
FIG. 3 is a schematic block diagram showing an arrangement of a conventional television set containing a color synchronization circuit.

FIG. 3 is a block diagram showing a schematic arrangement of a conventional television set including a so-called color synchronization circuit. The color synchronization circuit is a circuit for, in demodulating a chrominance signal in a television set, synchronizing a phase of a chrominance subcarrier signal which is to be a reference signal with a phase of the chrominance signal to be demodulated. The arrangement of the conventional television set shown in FIG. 3 will be described in the following.

In FIG. 3, the high frequency signal induced in an antenna 21 is applied to a tuner 23 through an antenna terminal 22. The tuner 23 receives a television video signal of a desired broadcasting station and outputs the same. The output signal of the tuner 23 is converted and amplified to have an intermediate frequency by an intermediate frequency amplifying circuit 24 and the applied to a terminal A of a switch SW1. Meanwhile, a video terminal 25 receives the video signal output from the video signal source 1 of FIG. 1. The video terminal 25 is connected to a terminal B of the switch SW1. The output signal of the switch SW1 is amplified by an amplifier 26 and then applied to a luminance signal separating circuit 27 and also to a chrominance separating circuit 28a and a synchronization separating circuit 28b in a color synchronization circuit 28. The luminance signal separating circuit 27 separates a luminance signal Y from the video signal applied from the amplifier 26 and applies the same to a matrix circuit 29.

The color synchronization circuit 28 includes the chrominance separating circuit 28a, the synchronization separating circuit 28b, a burst gate pulse generating circuit 28c, a phase comparator 28d, a low-pass filter 28e, a VCO 28f and a crystal oscillator 28g. The chrominance separating circuit 28a separates a chrominance signal from the video signal applied from the amplifier 26. The output of the chrominance separating circuit 28a is applied to a color demodulating circuit 30 and also to one input end of the phase comparator 28d. The synchronization separating from the video signal applied from the amplifier 26. The horizontal synchronizing signal output from the synchronization separating circuit 28b is applied to the burst gate pulse generating circuit 28c. The burst gate pulse generating circuit 28c delays the applied horizontal synchronizing signal to generate a burst gate pulse defining a period when a color burst signal is included in the chrominance signal. The burst gate pulse output from the burst gate pulse generating circuit 28c is applied to the phase comparator 28d as a timing signal for controlling timing for comparing of phases. The output of the phase comparator 28d is applied to the VCO 28f through the low-pass filter 28e. The VCO 28f has an oscillating frequency fluctuating in response to the control voltage from the low-pass filter 28e, with the oscillating frequency fsc of the crystal oscillator 28g as a center frequency. The output signal of the VCO 28f is applied to the color demodulating circuit 30 and also to the other input end of the phase comparator 28d. The color demodulating circuit 30 demodulates the chrominance signal applied from the chrominance separating circuit 28a, with a chrominance subcarrier signal applied from the VCO 28f as a reference signal to output color difference signals R-Y and B-Y. These color difference signals R-Y and B-Y are applied to the matrix circuit 29. The matrix circuit 29 generates three primary color signals R, G and B based on the luminance signal Y applied from the luminance signal separating circuit 27 and the color difference signals R-Y and B-Y applied from the color demodulating circuit 30 and applies the same to a CRT 31. The CRT 31 displays the contents corresponding to the applied three primary color signals R, G and B.

Operations of the conventional television set shown in FIG. 3 will be described. When the switch SW1 is turned to the terminal A, the video signal received by the tuner 23 is applied to the amplifier 26 through the intermediate frequency amplifying circuit 24. Conversely, when the switch SW1 is turned to the terminal B, the video signal input from the external video signal source 1 (see FIG. 1) is applied to the amplifier 26. The video signal output from the amplifier 26 is applied to the luminance signal separating circuit 27 and the chrominance separating circuit 28a to be separated into a luminance signal Y and a chrominance signal. The separated luminance signal Y is applied to the matrix circuit 29 without conversion. Meanwhile, the separated chrominance signal is applied to the color demodulating circuit 30 wherein the chrominance signal is demodulated and converted into the color difference signals R-Y and B-Y, the color demodulating circuit 30 carrying out demodulating operation of the chrominance signal with a chrominance subcarrier signal as a reference signal. At this time, the chrominance subcarrier signal used as a reference signal for the demodulating operation is required to have a phase synchronizing with the chrominance signal to be demodulated, that is, the burst signal of the chrominance signal separated by the chrominance separating circuit 28a. Therefore, the color synchronization circuit 28 is provided in order to synchronize the phase of the chrominance subcarrier signal as a reference signal with the phase of the burst signal to be demodulated. In the color synchronization circuit 28, the phase comparator 28d detects a phase difference between the burst signal from the chrominance separating circuit 28a and the output signal of the VCO 28f (chrominance subcarrier signal), so that the oscillating frequency of the VCO 28f is controlled in response to the phase difference. As a result, the phase of the chrominance subcarrier signal applied as a reference signal from the VCO 28f to the color demodulating circuit 30 always synchronizes with that of the burst signal output from the chrominance separating circuit 28a. The phase comparator 28d performs the phase comparing operation only when the burst gate pulse applied from the burst gate pulse generating circuit 28c is output, that is, when the color burst signal is included in the chrominance signal. The luminance signal Y separated by the luminance signal separating circuit 27 and the color difference signals R-Y and B-Y output from the color demodulating circuit 30 are converted into the three primary color signals R, G and B in the matrix circuit 29 and applied to the CRT 31. Accordingly, the CRT 31 displays the contents corresponding to these three primary color signals R, G and B.

The color synchronization circuit 28 shown in FIG. 3 is disclosed in, for example, Japanese Patent Laying-Open No. 62-183292.

As shown in FIG. 2, a conventional video tape recorder is provided with a jitter removing circuit to remove jitter component of a chrominance signal. However, it is difficult to remove the jitter components completely from the chrominance signal only by such a jitter removing circuit as shown in FIG. 2. Accordingly, some of the jitter component is not removed, which is applied to the television set 2.

The color synchronization circuit 28 in the conventional television set shown in FIG. 3 has a time constant of a loop set to a long period of about 30 H (H is one horizontal scanning period) so as to perform a comparatively stable operation even in a weak electric field, which is directed to the prevention of disturbance in color synchronization even when the color burst signal is temporarily buried in the noise component in a weak electric field. Accordingly, the color synchronization circuit 28 performs an average phase control for a period of 30 H but can not follow the color jitter component of a relatively short period shorter than 30H. Therefore, the jitter component which could not be removed in the jitter removing circuit in FIG. 2 results in disturbance in hue on a picture frame of the CRT, causing deterioration of the picture quality.

Such a color jitter component of a relatively short period as described above is often included in a reproduced output color video signal of a laser disk player or a video tape recorder. Therefore, the picture quality in the reproduction is deteriorated particularly in the case where a laser disk player or a video tape recorder is used as a video signal source 1. In order to resolve the above-described problems, proposed is a provision of an additional jitter removing circuit in some part of the video system shown in FIG. 1. This additional jitter removing circuit removes the jitter component which could not be removed by the jitter removing circuit provided in such a video tape recorder as shown in FIG. 2.

Figure 4A:
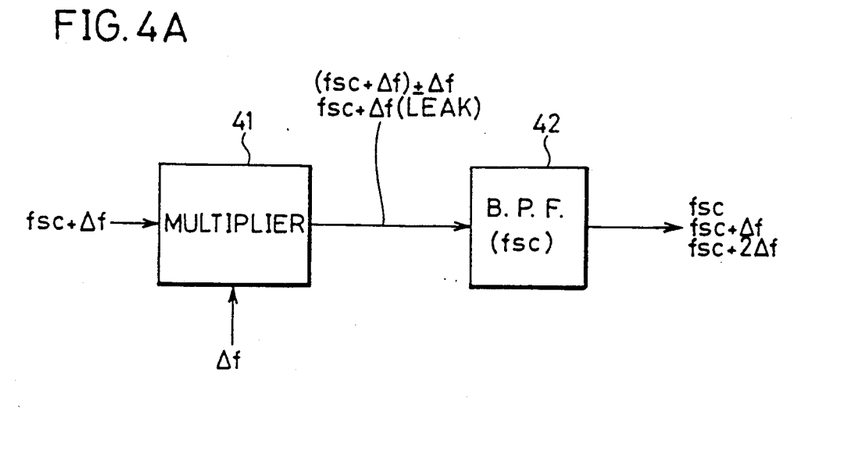
FIG. 4A is a schematic block diagram showing a common arrangement of an additional provided jitter removing circuit.

FIG. 4A is a theoretical block diagram showing a common arrangement of a jitter removing circuit additionally provided as described above. In the drawing, a chrominance signal having a frequency of $fsc+\Delta f$ is applied one input end of a multiplier 41, wherein fsc denotes a chrominance subcarrier frequency and $\Delta f$ denotes jitter component. Jitter components of extracted from the original chrominance signal by some way is applied to the other input end of the multiplier 41. Thus, the multiplier 41 multiplies the chrominance signal including the jitter component $\Delta f$ and the jitter component $\Delta f$ together. At this time, the output signal of the multiplier 41 includes frequency component of $(fsc+\Delta f)\pm\Delta f$ and frequency component of $fsc+\Delta f$, wherein the frequency component of $fsc+\Delta f$ is a leak signal in the multiplier 41. A bandpass filter 42 has a pass band having a center frequency of a chrominance subcarrier frequency fsc and limits the band width of the output signal of the multiplier 41.

Figure 4B:
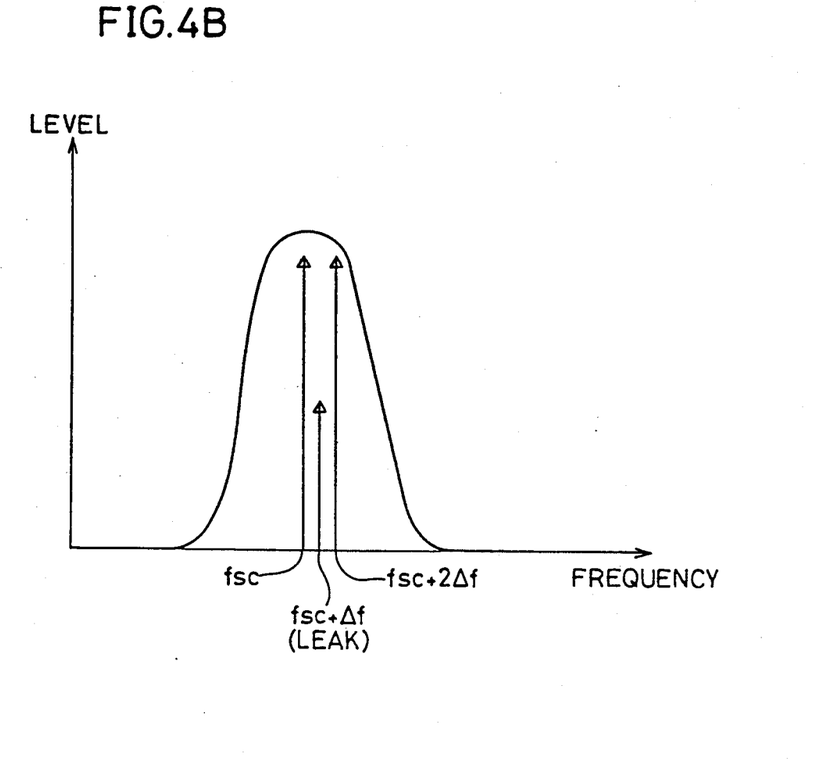
FIG. 4B is a diagram showing a relationship between a frequency component included in an output signal of a multiplier and pass band characteristic of a bandpass filter shown in FIG. 4A.

FIG. 4B is a diagram showing a relationship between the output of the multiplier 41 and the pass band of the bandpass filter 42 in FIG. 4A. As shown in the diagram, the output signal of the multiplier 41 mainly includes three frequency components, that is, fsc, $fsc+\Delta f$ and $fsc+2\Delta f$. As shown in FIG. 4B, these three frequency components are very close to each other. Meanwhile, the pass band characteristic of the bandpass filter 42 cannot be made extremely sharp because the pass band should be wide to some extent in order to cover frequency deviation of the chrominance signal. Therefore, the three frequency components included in the multiplier 41 are included in the pass band of the bandpass filter 42, so that it is not possible to extract the frequency component of fsc only. Accordingly, the jitter component is not removed but output from the bandpass filter 42.

SUMMARY OF THE INVENTION

An object of the present invention is to provide a circuit for removing jitter of a chrominance signal capable of removing jitter component almost completely which cannot be removed by a conventional jitter removing circuit.

Another object of the present invention is to provide a television set comprising a jitter removing circuit having a simple arrangement and capable of removing jitter component of a chrominance signal almost completely.

The jitter removing circuit according to the present invention is a circuit for removing jitter component from a chrominance signal included in a color video signal, including first and second frequency converting devices, separating devices, reference frequency signal generating devices, a phase comparing device and a variable frequency oscillating device. The first frequency converting device includes first multiplying means and a first bandpass filter, and converts a frequency of the chrominance signal separated from the color video signal from a first frequency to a second frequency. The second frequency converting device includes second multiplying device and a second bandpass filter, and reconverts the frequency of the chrominance signal output from the first frequency converting device to the first frequency. The separating device separates a color burst signal from the chrominance signal output from the second frequency converting device. The reference frequency signal generating device generates a reference frequency signal of a chrominance subcarrier frequency. The phase comparing device compares phases of the color burst signal separated by the separating device and the reference frequency signal. The variable frequency oscillating device has an oscillating frequency fluctuating in response to the output of the phase comparing device. The first multiplying device included in the first frequency converting device multiplies the chrominance signal separated from the color video signal and a first signal together. The first bandpass filter included in the first frequency converting device limits the band width of the output signal of the first multiplying device, with the second frequency as a center frequency. The second multiplying device included in the second frequency converting device multiplies the chrominance signal output from the first bandpass filter and a second signal together. The second bandpass filter included in the second frequency converting device limits the band width of the output signal of the second multiplying device, with the first frequency as a center frequency. The output of the variable frequency oscillating device is applied as the first and the second signals to one of the first and the second multipliers and a fixed frequency signal is applied to the other.

The television set according to the present invention includes a jitter removing circuit for correcting a chrominance signal included in a color video signal to remove jitter component from the chrominance signal and a color synchronization circuit, in demodulating a chrominance signal, for synchronizing a phase of a chrominance subcarrier signal as a reference signal with a phase of the chrominance signal to be demodulated. The color synchronization circuit includes a chrominance subcarrier signal oscillating device and a phase comparing device. The chrominance subcarrier signal oscillating device oscillates centered at the chrominance subcarrier frequency as a center frequency and an oscillating frequency thereof fluctuates in response to an applied control voltage. The phase comparing device compares phases of the chrominance signal from which the jitter is removed by the jitter removing circuit and the output signal of the chrominance subcarrier signal oscillating device to generate the above-described control voltage to be applied to the chrominance subcarrier signal oscillating device. The jitter removing circuit includes first and second frequency converting devices, a separating devices, a phase comparing device and a variable frequency oscillating device. The first frequency converting device has a first multiplying device and a first bandpass filter, and converts the frequency of the chrominance signal separated from the color video signal from a first frequency to a second frequency. The second frequency converting device has a second multiplying device and a second bandpass filter, and reconverts the frequency of the chrominance signal output from the first frequency converting device to the first frequency. The separating device separates a color burst signal from the chrominance signal output from the second frequency converting device. The phase comparing device compares phases of the color burst signal separated from the separating device and the output signal of the chrominance subcarrier signal oscillating device. The variable frequency oscillating device has an oscillating frequency changing in response to the output of the phase comparing device. The first multiplying device included in the first frequency converting device multiplies the chrominance signal separated from the color video signal and a first signal together. The first bandpass filter included in the first frequency converting device limits band width of the output signal of the first multiplying device, with the second frequency as a center frequency. The second multiplying device included in the second frequency converting device multiplies the chrominance signal output from the first bandpass filter and a second signal together. The second bandpass filter included in the second frequency converting device limits the band width of the output signal of the second multiplying device, with the first frequency as a center frequency. The output of the variable frequency oscillating device is applied as the above-described first and second signals to one of the first and second multipliers and a fixed frequency signal is applied to the other.

In the jitter removing circuit according to the present invention, after the chrominance signal is converted to have a different frequency by the first frequency converting device, the signal is reconverted to have the original frequency by the second frequency converting device. The multiplication result by the first multiplying device and the leak signal have frequencies very different from each other and similarly, the multiplification by the second multiplying device and the leak signal have frequencies very different from each other. As a result, the leak signal can be completely removed by the first and the second bandpass filter, whereby the jitter components can be removed almost completely.

In addition, in the television set according to the present invention, the output signal of the chrominance subcarrier signal oscillating device constituting a part of the color synchronization circuit is applied to the phase comparing device in the jitter removing circuit. Therefore, no provision of the reference frequency signal generating device is required in the jitter removing circuit, thereby allowing the arrangement of the circuit to be simplified.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First referring to FIG. 5, a schematic arrangement of a jitter removing circuit according to one embodiment of the present invention will be described. A chrominance signal including a jitter component $\Delta f$ is applied to a first frequency converting means 51. The first frequency converting means converts the frequency of the applied chrominance signal from a first frequency to a second frequency. The output signal of the first frequency converting means 51 is applied to a second frequency converting means. The second frequency converting means 52 converts the frequency of the chrominance signal applied from the first frequency converting means 51 to the original first frequency. The above-described second frequency can be higher or lower than the above-described first frequency. It is important that the first frequency and the second frequency largely differ from each other. A burst separating circuit 53 separates a color burst signal from the chrominance signal output from the second frequency converting means 52. The color burst signal output from the burst separating circuit 53 is applied to one input end of a phase comparator 54. The other input end of the phase comparator 54 receives a reference frequency signal output from a reference oscillator 55. The output of the phase comparator 54 is applied to a VCO 56 as a control voltage. The VCO 56 has an oscillating frequency fluctuating in response to the control voltage applied from the phase comparator 54. The output signal of the VCO 56 is applied to one of the first and the second frequency converting means 51 and 52. The first frequency converting means 51 comprises a multiplier 51a and a bandpass filter 51b as shown in FIG. 6A. Similarly, the second frequency converting means 52 comprises a multiplier 52a and a bandpass filter 52b as shown in FIG. 6A. The output signal of the VCO 56 is applied to one of the multipliers 51a and 52a.

In the jitter removing circuit having such an arrangement as described above shown in FIG. 5, the jitter component included in the chrominance signal is detected in the phase comparator 54, so that the oscillating frequency of the VCO 56 fluctuates in response to the detection result. The output signal of the VCO 56 is applied to one of the multipliers of the first and the second frequency converting means 51 and 52. Accordingly, the jitter component is removed from the chrominance signal either in the first frequency converting means 51 or in the second frequency means 52.

Provision of such a burst continuous wave converting apparatus between the burst separating circuit 53 and the phase comparator 54 as disclosed in U.S. Pat. No. 4,930,003.

Figure 5:
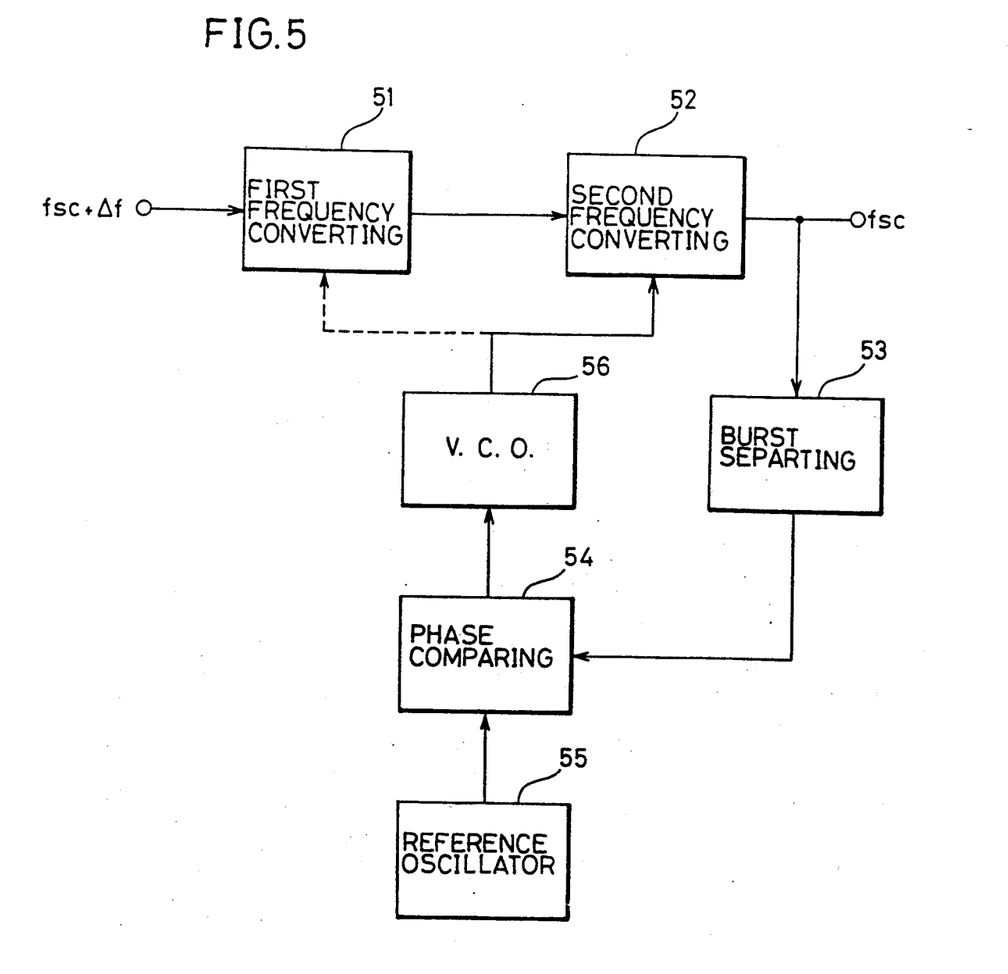
FIG. 5 is a block diagram showing a schematic arrangement of a jitter removing circuit according to one embodiment of the present invention.
Figure 6A:
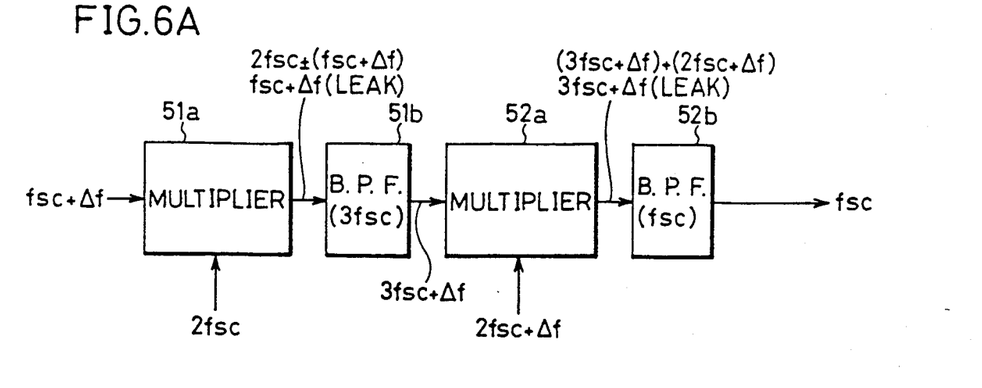
FIG. 6A is a block diagram showing an arrangement of the first and the second frequency converting means shown in FIG. 5.
Figure 6B:
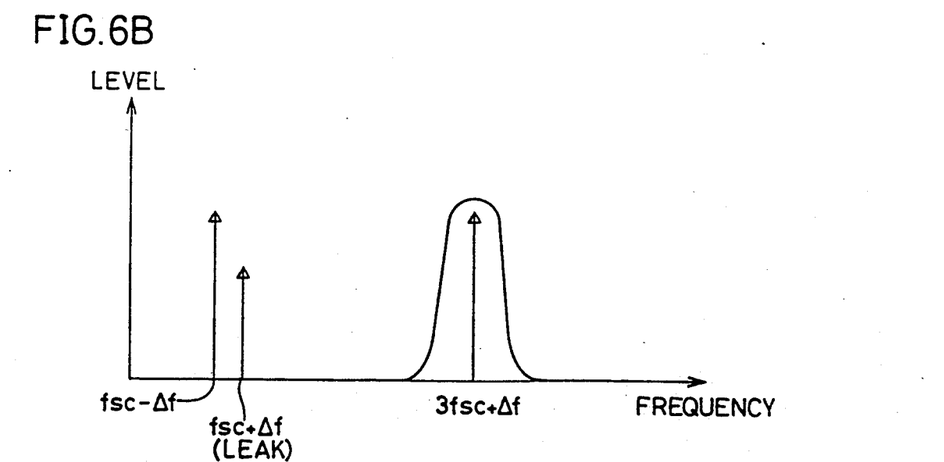
FIG. 6B is a diagram showing a relationship between frequency component included in an output signal of a multiplier 51a and pass band characteristic of a bandpass filter 51b in FIG. 6A.
Figure 6C:
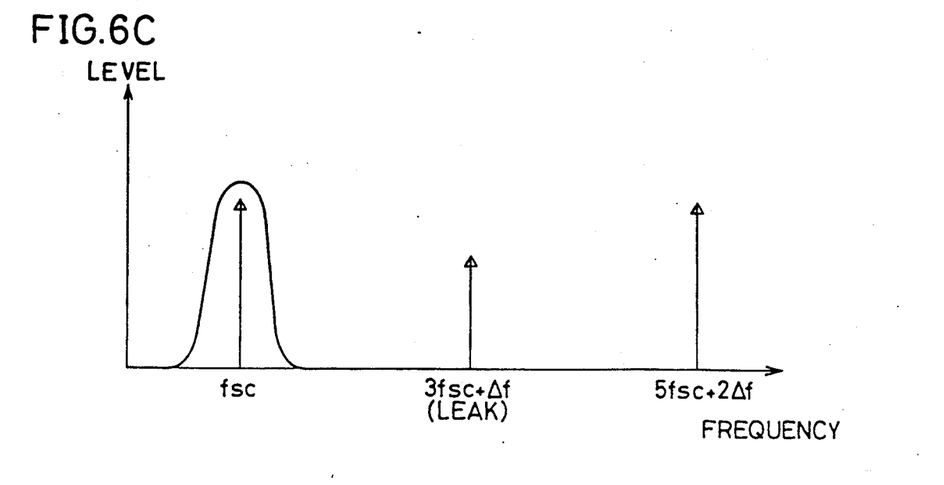
FIG. 6C is a diagram showing a relationship between frequency component included in an output signal of a multiplier 52a and pass band characteristic of a bandpass filter 52b in FIG. 6A.

Referring to FIGS. 6A–6C, operations and effects of the jitter removing circuit shown in FIG. 5 will be described. As an example, it is assumed that the multiplier 51a receives a signal having a double chrominance subcarrier frequency 2fsc as a first signal to be multiplied by the chrominance signal and the multiplier 52a receives a signal having a frequency 2fsc+$\Delta$f as a second signal to be multiplied by the chrominance signal output from the bandpass filter 51b, wherein $\Delta$f is a jitter component. Meanwhile, a center frequency of the pass band of the bandpass filter 51b is set to a triple chrominance subcarrier frequency 3fsc and a center frequency of the pass band of the bandpass filter 52b is set to a chrominance subcarrier frequency fsc.

In the above-described arrangement, the multiplier 51a multiplies the chrominance signal including the jitter component $\Delta$f and the signal having the frequency 2fsc together. As a result, the output signal of the multiplier 51a includes a frequency component of fsc-$\Delta$f, a frequency component of fsc+$\Delta$f and a frequency component of 3fsc+$\Delta$f as shown in FIG. 6B. The frequency component of fsc+$\Delta$f is a leak signal of the multiplier 51a. Since the center frequency of the pass band of the bandpass filter 51b is set to 3fsc as described above, only the frequency component of 3fsc+$\Delta$f in the output signal of the multiplier 51a is extracted. The other frequency components included in the output signal of the multiplier 51a so widely differ from the frequency component of 3fsc+$\Delta$f that they are cut by the bandpass filter 51b. Accordingly, the chrominance signal of 3fsc+$\Delta$f is applied from the bandpass filter 51b to the multiplier 52a. The multiplier 52a multiplies the chrominance signal of 3fsc+$\Delta$f applied from the bandpass filter 51b and the frequency signal of 2fsc+$\Delta$f together. As a result, the output signal of the multiplier 52a includes a frequency component of fsc, a frequency component of 3fsc+$\Delta$f and a frequency component of 5fsc+2$\Delta$f as shown in FIG. 6C, wherein the frequency component of 3fsc+$\Delta$f is a leak signal of the multiplier 52a. As described above, since the center frequency of the pass band of the bandpass filter 52b is set to fsc, only fsc out of the frequency components included in the output signal of the multiplier 52a is extracted by the bandpass filter 52b. The other frequency components included in the output signal of the multiplier 52a so widely differ from the frequency component of fsc that they are cut by the bandpass filter 52b. Accordingly, only the chrominance signal of fsc from which the jitter component $\Delta$f is removed is output from the bandpass filter 52b.

As the foregoing, in the embodiment shown in FIG. 5, the frequency of chrominance signal is converted from the first signal to the second signal and then restored to the first frequency. As a result, the multiplication result and the leak signal widely differ in frequency from each other in the multipliers 51a and 52a of the frequency converting means 51 and 52 respectively. Therefore, the leak signal can be easily cut by the bandpass filters 51b and 52b, thereby allowing extraction of only a desired frequency component. Accordingly, the chrominance signal from which the jitter components is removed can be obtained from the second frequency converting means 52.

Figure 7:
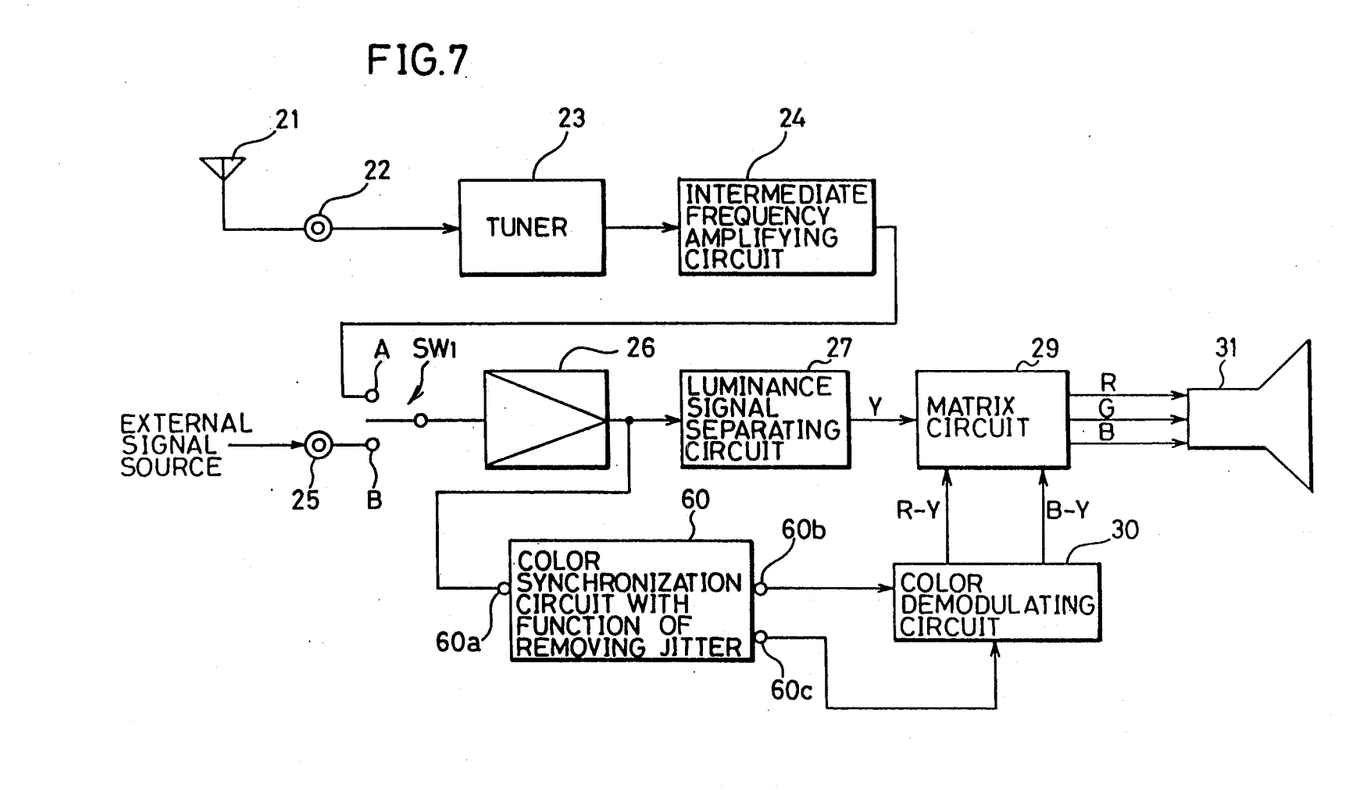
FIG. 7 is a block diagram showing a schematic arrangement of a television set according one embodiment of the present invention.
Figure 8:
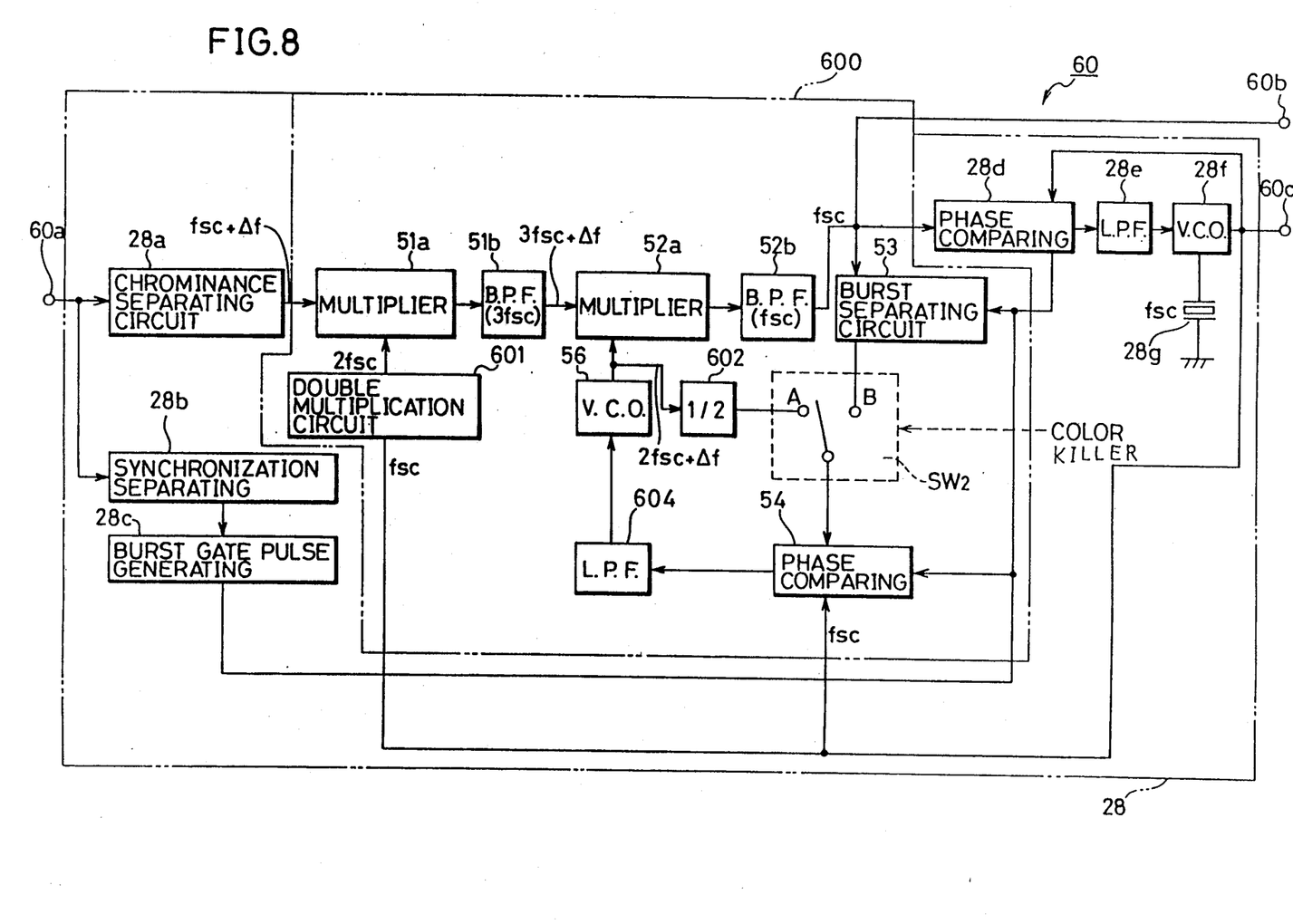
FIG. 8 is a block diagram showing an arrangement of a color synchronization circuit having a function of removing jitter shown in FIG. 7.

FIG. 7 is the block diagram showing the schematic arrangement of the television set according to one embodiment of the present invention. In the drawing, a color synchronization circuit 60 with the function of removing jitter is provided in this embodiment in place of the color synchronization 28 of FIG. 3. The video signal is applied from the amplifier 26 to an input terminal 60a of the color synchronization circuit 60 with the function of removing jitter. The color synchronization circuit 60 with the function of removing jitter separates a chrominance signal from the applied video signal and removes the jitter component from the separated chrominance signal. The jitter component removed chrominance signal is output from an output terminal 60b and applied to the color demodulating circuit 30. The color synchronization circuit 60 with the function of removing jitter generates a chrominance subcarrier signal synchronizing with the jitter component removed chrominance signal, which is output from an output terminal 60c. The chrominance subcarrier signal is applied to the color demodulating circuit 30 as a reference signal in demodulating the chrominance signal. The other arrangements of the television set shown in FIG. 7 are the same as those of the television set shown in FIG. 3, wherein the same reference numerals are allotted to the corresponding portions to omit a description thereof. Referring to FIG. 8, described is a more detailed arrangement and operations of the color synchronization circuit 60 with the function of removing jitter shown in FIG. 7.

As shown in FIG. 8, the color synchronization circuit 60 with the function of removing jitter has a jitter removing circuit 600 provided between a chrominance separating circuit 28a and a phase comparator 28b of the color synchronization circuit 28. The color synchronization circuit 28 has the same arrangement as that of the color synchronization circuit 28 shown in FIG. 3. Similar to the jitter removing circuit shown in FIGS. 5 and 6, the jitter removing circuit 600 includes a multiplier 51a, a bandpass filter 51b, a multiplier 52a, a bandpass filter 52b, a burst separating circuit 53, a phase comparator 54 and a VCO 56. The jitter removing circuit 600 is further provided with a double multiplication circuit 601, a ½ frequency dividing circuit 602, a switch SW2 and a low-pass filter 604. The chrominance signal separated by the chrominance separating circuit 28a is applied to one input end of the multiplier 51a. The output signal of the double multiplication circuit 601 is applied to the other input end of the multiplier 51a. The double multiplication circuit 601 multiplies the output signal of the VCO 28f by double. The output of the multiplier 51a is applied to one input end of the multiplier 52a through the bandpass filter 51b. The output signal of the VCO 56 is applied to the other input end of the multiplier 52a. The output signal of the multiplier 52a is applied to one input end of the phase comparator 28d through the bandpass filter 52b and also to an output terminal 60b. The output signal of the bandpass filter 52b is further applied to the burst separating circuit 53 wherein a color burst signal in the chrominance signal is separated. The color burst signal separated by the burst separating circuit 53 is applied also to a terminal B of the switch SW2. The output signal of the ½ frequency dividing circuit 602 is applied to the other terminal A of the switch SW2. The ½ frequency dividing circuit 602 divides the frequency of the output signal of the VCO 56 into halves. The output signal of the switch SW2 is applied to one input end of the phase comparator 54. The output signal of the VCO 28f is applied to the other input end of the phase comparator 54. The output signal of the phase comparator 54 is applied as a control voltage to the VCO 56 through the low-pass filter 604. The frequency of the VCO 56 fluctuates in response to the applied control voltage. The burst gate pulse is applied from a burst gate pulse generating circuit 28c to the burst separating circuit 53 and the phase comparator 54. Accordingly, the burst separating circuit 53 and the phase comparator 54 operates only in a period of the color burst signal defined by the burst gate pulse. The switch SW2 is controlled by a color/monochrome determination signal from a color killer circuit (not shown). As is well known, the color killer circuit is a circuit for making the determination as to whether an input video signal is a signal which can be reproduced in color or not and stopping operations of a color signal system when the level of the chrominance signal is low when received in a weak electric field or the signal is a monochrome video signal.

Operations of the color synchronization circuit 60 with the function of removing jitter shown in FIG. 8 will be described.

First, similarly to the color synchronization circuit 28 shown in FIG. 3, the color synchronization circuit 28 operates, in demodulating a chrominance signal by the color demodulating circuit, to synchronize a phase of a chrominance subcarrier signal as a reference signal for the demodulating operation with the phase of the burst signal to be demodulated. However, since the color demodulating circuit 30 demodulates the chrominance signal from which the jitter component is removed by the jitter removing circuit 600 in the television set of FIG. 7, the phase comparator 28d compares the phases of the output signal of the VCO 28f and the output signal of the jitter removing circuit 600. The other operations are the same as those of the color synchronization circuit 28 shown in FIG. 3, and therefore, no detailed description thereof will be made.

Operations of the jitter removing circuit 600 will be described. First, the double multiplication circuit 601 multiplies the output signal of the VCO 28f by double to generate a frequency signal having a double chrominance subcarrier frequency 2fsc and applies the same to the multiplier 51a. Accordingly, similarly to the case in FIG. 6A, the multiplier 51a multiplies the chrominance signal including the jitter component Δf and the frequency signal of 2fsc together. Having the center frequency of the pass band set to 3fsc, the bandpass filter 51b outputs the chrominance signal of 3fsc+Δf, similarly to the case in FIG. 6A.

Then, when the video signal to be displayed in the television set is a color video signal, the switch SW2 is switched to the terminal B by the color/monochrome determination signal from the color killer circuit. As a result, the color burst signal separated in the burst separating circuit 53 is applied to one input end of the phase comparator 54 through the switch SW2. Accordingly, the phase comparator 54 compares the phases of the separated color burst signal and the chrominance subcarrier signal applied from the VCO 28f in the period of the color burst signal. At this time, the output voltage value of the phase comparator 54 varies in response to the jitter component included in the chrominance signal output from the bandpass filter 52b. The output voltage of the phase comparator 54 is applied as a control voltage for a frequency to the VCO 56 through the low-pass filter 604. The oscillating frequency of the VCO 56 fluctuates centered at 2fsc in response to the control signal from the low-pass filter 604. Accordingly, the frequency of the output signal of the VCO 56 becomes 2fsc+Δfm. At this time, similarly to the case in FIG. 6A, the multiplier 52a multiplies the chrominance signal of 3fsc+Δf and the frequency signal of 2fsc+Δf together. In addition, having the center frequency of the pass band set to fsc, the bandpass filter 52b outputs the chrominance signal (having a frequency of fsc) from which the jitter component is removed, similarly to the case in FIG. 6A. The chrominance signal output from the bandpass filter 52b is applied to the color demodulating circuit 30 through the output terminal 60b. The color demodulating circuit 30 demodulates the chrominance signal applied from the jitter removing circuit 600, using the chrominance subcarrier signal applied from the color synchronization circuit 28 as a reference signal, to output the color difference signals R-Y and B-Y.

Meanwhile, when the video signal to be displayed in the television set of FIG. 7 is a monochrome video signal, the switch SW2 is switched to a terminal A by the color/chrominance determination signal from the color killer circuit. Therefore, one input end of the phase comparator 54 receives the output signal of the ½ frequency dividing circuit 602 through the switch SW2. As described previously, since the center frequency of the oscillating frequency of the VCO 56 is set to 2fsc, the ½ frequency dividing circuit 602 outputs a frequency signal of fsc. Accordingly, the phase comparator 54 compares the phases of the frequency signal of fsc applied from the ½ frequency dividing circuit 602 and the chrominance subcarrier signal of fsc applied from the VCO 28f together. As a result, the PLL (phase-locked loop) comprising the VCO 56, the ½ frequency dividing circuit 602, the phase comparator 54 and the low-pass filter 604 is locked such that the oscillating frequency of the VCO 56 becomes about 2fsc. The oscillating frequency of the VCO 56 is fixed to 2fsc in this way when processing the monochrome video signal is to prevent the above-described PLL from being locked by mistake. Namely, even in the processing of a monochrome video signal, when the switch SW 2 is turned to the terminal B, the oscillating frequency of the VCO 56 might widely deviate from 2fsc. If the chrominance signal is suddenly input in such a case, the oscillating frequency of the VCO 56 might not be locked to the frequency fsc but to the side band of the chrominance signal. Such locking by mistake is referred to as "side lock".

Figure 9:
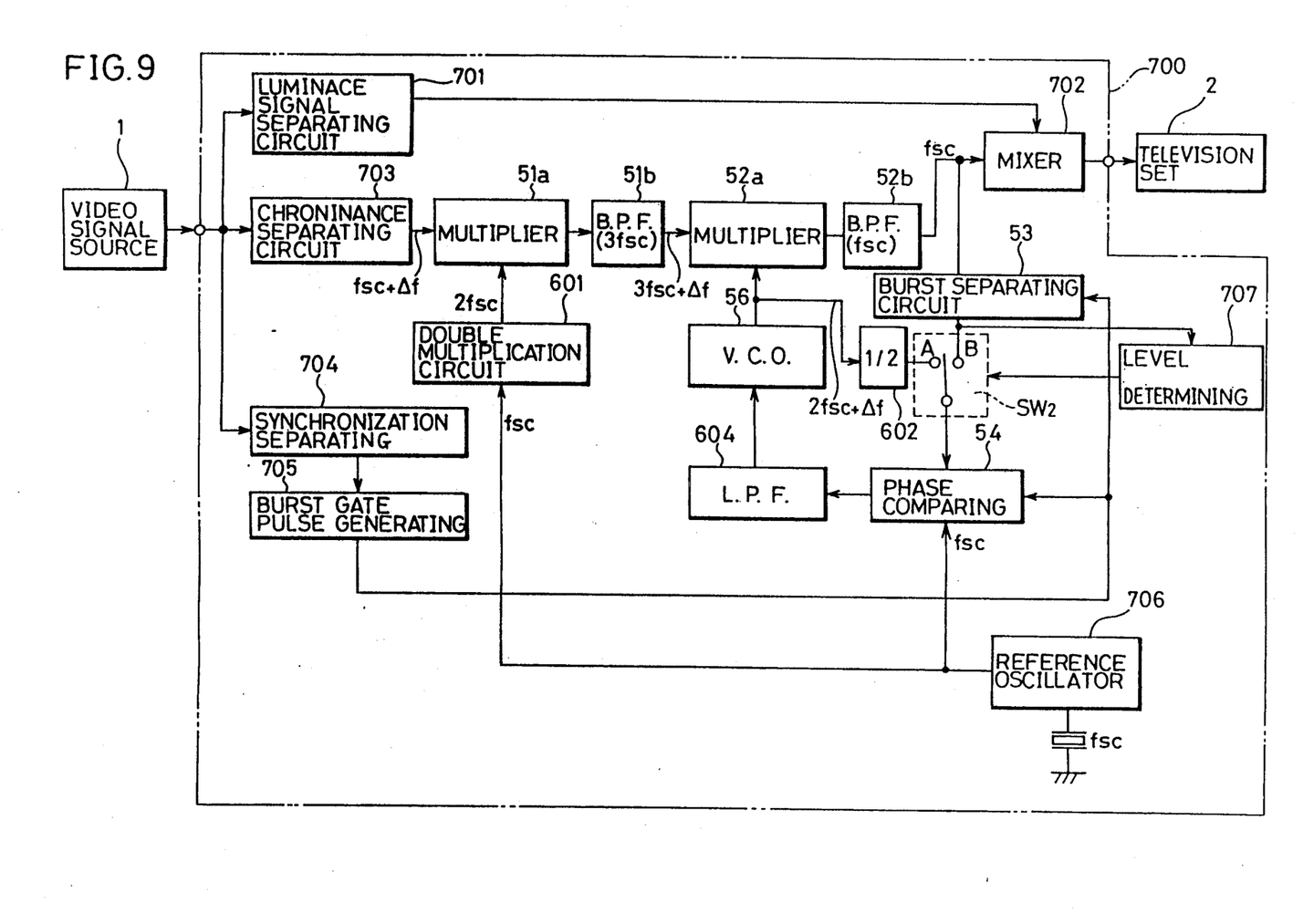
FIG. 9 is a block diagram showing an arrangement of a jitter removing circuit of other embodiment of the present invention, which is used as an interface between a video signal source and a television receiver.

FIG. 9 is a block diagram showing the arrangement of the jitter removing circuit according to another embodiment of the present invention. A jitter removing circuit 700 shown in FIG. 9 is provided as an interface between a video signal source 1 such as a laser disk player or a video tape recorder and a television set 2. In the drawing, a luminance signal separating circuit 701 separates a luminance signal from a video signal input from the video signal source 1. The luminance signal separated by the luminance signal separating circuit 701 is applied to a mixing circuit 702. A chrominance separating circuit 703 separates a chrominance signal from the video signal input from the video signal source 1. The chrominance signal separated by the chrominance separating circuit 703 is applied to one input end of a multiplier 51a. A synchronization separating circuit 704 separates a horizontal synchronizing signal from the video signal input from the vide signal source 1. The horizontal synchronizing signal separated by the synchronization separating circuit 704 is applied to a burst gate pulse generating circuit 705. The burst gate pulse generating circuit 705 delays the applied horizontal synchronizing signal to generate a burst gate pulse which is output from the burst gate pulse generating circuit 705. The burst gate pulse is applied to a burst separating circuit 53 and a phase comparator 54. A reference oscillator 706 generates a reference frequency signal having a frequency of fsc. This reference frequency signal is applied to the other input end of the phase comparator 54 and a double multiplication circuit 601. A level determination circuit 707 makes the determination as to whether or not the level of the color burst signal separated by the burst separating circuit 53 is higher than a prescribed level to determine whether the video signal input from the video signal source 1 is a color video signal or a monochrome video signal. The signal of the determination result of the level determination circuit 707 is applied to the switch SW2 as a switch control signal. Namely, the level determination circuit 707 serves similarly to the color killer circuit in FIG. 8 for the switch SW2. An output signal of a bandpass filter 52b is applied to the mixing circuit 702.

As is the foregoing, the jitter removing circuit 700 shown in FIG. 9 has the separate reference oscillator 706 provided therein, whereby the phase comparator 54 compares the phases of the output signal of the reference oscillator 706 and the color burst signal separated by burst separating circuit 53. In the above-described embodiment of FIG. 8, the VCO 28f included in the color synchronization circuit 28 also serves as a reference oscillator of the jitter removing circuit 600. The embodiment of FIG. 8 differs from the embodiment of FIG. 9 very much in this respect.

Furthermore, in the jitter removing circuit 700 shown in FIG. 9, the jitter removed chrominance signal output from the bandpass filter 52b and the luminance signal separated in the luminance signal separating circuit 701 are mixed in the mixing circuit 702 and reconverted to a color video signal which is applied to the television set 2. The other arrangements of the jitter removing circuit 700 are the same as those of the jitter removing circuit 600 shown in FIG. 8, wherein the same reference numerals are allotted to the corresponding portions to omit a description thereof.

While in the above-described embodiments, the descriptions are made of the cases where the jitter removing circuit according to the present invention is provided in the television set and the circuit is provided as an interface between the video signal source and the television set, the jitter removing circuit according to the present invention may be provided in any part of the video system shown in FIG. 1. For example, it may be provided inside the video signal source.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A circuit for removing a jitter component from a chrominance signal included in a color video signal, comprising:
   1) a first frequency converting means for converting a frequency of a chrominance signal, separated from the color video signal, from a first frequency into a second frequency, said first frequency converting means including
      a) first multiplying means for multiplying said chrominance signal, separated from said color video signal, and a first signal together,
      b) a first bandpass filter, connected to said first multiplying means, said first bandpass filter having a center frequency of said second frequency for limiting a band width of an output signal of said first multiplying means;
   2) a second frequency converting means, connected to said first frequency converting means, for reconverting the frequency of the chrominance signal output from said first frequency converting means into said first frequency, said second frequency converting means including
      a) second multiplying means, connected to said first bandpass filter, for multiplying the chrominance signal, output from said first bandpass filter, and a second signal together,
      b) a second bandpass filter, connected to said second multiplying means, said second bandpass filter having a center frequency of said first frequency for limiting a band width of an output signal of said second multiplying means;
   3) separating means, connected to said second bandpass filter, for separating a color burst signal from the chrominance signal output from said second frequency converting means;
   4) reference frequency signal generating means for generating a reference frequency signal of a chrominance subcarrier frequency;
   5) phase comparing means, connected to said separating means and said reference signal generating means, for comparing phases of said color burst signal separated by said separating means and said reference frequency signal;
   6) variable frequency oscillating means, connected to said phase comparing means and said first and second frequency converting means, having an oscillating frequency fluctuating in response to an output of said phase comparing means, said variable frequency oscillating means being structured to have the oscillating frequency fluctuating centered at a prescribed frequency;
   7) determining means for determining whether said color video signal is input or not; and
   8) oscillating frequency fixing means, connected to said determining means and said variable frequency oscillating means and responsive to said color video signal not being input, for fixing the oscillating frequency of said variable frequency oscillating means to said prescribed frequency,
one of said first and second multiplying means receiving an output of said variable frequency oscillating means as said first or said second signals and the other receiving a fixed frequency signal.

2. The circuit for removing jitter of a chrominance signal according to claim 1, wherein said second frequency is set to be higher than said first frequency.

3. The circuit for removing jitter of a chrominance signal according to claim 1, wherein said second frequency is set to be lower than said first frequency.

4. The circuit for removing jitter of a chrominance signal according to claim 1, wherein said fixed frequency signal is generated based on said reference frequency signal.

5. The circuit for removing jitter of a chrominance signal according to claim 1, wherein said oscillating frequency fixing means includes a phase-locked loop for comparing phases of said reference frequency signal and a signal based on the output of said variable frequency oscillating means to feed back a comparison result to said variable frequency oscillating means.

6. The circuit for removing jitter of a chrominance signal according to claim 5, further comprising switching means operating in response to a determination output of said determining means to apply the color burst signal separated by said separating means to said phase comparing means when said color video signal is input and applying said signal based on said variable frequency oscillating means to said phase comparing means when said color video signal is not input, wherein said phase comparing means also serves in said phase-locked loop.

7. The circuit for removing jitter of a chrominance signal according to claim 6, wherein said determining means includes means for determining whether said color video signal is input or not based on a level of said color burst signal separated by said separating means.

8. A television set comprising:
1) a jitter removing circuit for removing a jitter component of a chrominance signal by correcting the chrominance signal included in a color video signal; and
2) a color synchronization circuit for synchronizing a phase of a chrominance subcarrier signal which is a reference signal in demodulating the chrominance signal with a phase of the chrominance signal to be demodulated, said color synchronization circuit including
   a) chrominance subcarrier signal oscillating means for oscillating, with a chrominance subcarrier frequency as a center frequency and having an oscillating frequency fluctuating in response to an applied control voltage, and
   b) chrominance phase comparing means, connected to said chrominance subcarrier oscillating means, for comparing phases of the chrominance signal, from which the jitter component is removed by said jitter removing circuit, and an output signal of said chrominance subcarrier signal oscillating means to generate said control voltage to be applied to said chrominance subcarrier signal oscillating means;
said jitter removing circuit including
   a) first frequency converting means for converting a frequency of the chrominance signal, separated from the color video signal, from a first frequency into a second frequency, said first frequency converting means having
      a1) first multiplying means for multiplying the chrominance signal, separated from said color video signal, and a first signal together, and
      a2) a first bandpass filter, connected to said first multiplying means, said first bandpass filter having a center frequency of said second frequency for limiting a band width of an output signal of said first multiplying means;
   b) second frequency converting means, connected to said first frequency converting means, for reconverting the frequency of the chrominance signal output from said first frequency converting means into said first frequency, said second frequency converting means having
      b1) second multiplying means, connected to said first bandpass filter, for multiplying the chrominance signal, output from said first bandpass filter, and a second signal together, and
      b2) a second bandpass filter, connected to said second multiplying means, said second bandpass filter having a center frequency of said first frequency for limiting a band width of an output signal of said second multiplying means;
   c) separating means, connected to said second bandpass filter and said chrominance phase comparing means, for separating a color burst signal from the chrominance signal output from said second frequency converting means;
   d) color burst phase comparing means, connected to said chrominance phase comparing means and said chrominance subcarrier signal oscillating means, for comparing phases of the color burst signal separated by said separating means and the output signal of said chrominance subcarrier signal oscillating means;
   e) variable frequency oscillating means, connected to said color burst phase comparing means and said second frequency converting means, for having an oscillating frequency fluctuating in response to an output of said color burst phase comparing means, wherein said variable frequency oscillating means is structured such that said oscillating frequency thereof fluctuates centered at a prescribed frequency;
   f) determining means for determining whether said color video signal is input or not;
   g) oscillating frequency fixing means, connected to said determining means, said separating means, said color burst phase comparing means and said variable frequency oscillating means, for fixing the oscillating frequency of said variable frequency oscillating means to said prescribed frequency in response to a determination by said determining means that said color video signal is input,
one of said first and second multiplying means receiving an output of said variable frequency oscillating means as said first or second signals and the other receiving a fixed frequency signal.

9. The television set according to claim 8, wherein said second frequency is set to be higher than said first frequency.

10. The television set according to claim 8, wherein said second frequency is set to be lower than said first frequency.

11. The television set according to claim 8, wherein said fixed frequency signal is generated based on the output signal of said chrominance subcarrier signal oscillating means.

12. The television set according to claim 8, wherein said oscillating frequency fixing means includes a phase-locked loop for comparing phases of said reference frequency signal and a signal based on the output of said variable frequency oscillating means to feed back a comparison result to said variable frequency oscillating means.

13. The television set according to claim 12, further comprising switching means operating in response to the determination of said determining means to apply the color burst signal separated by said separating means to said phase comparing means when said color video signal is input and apply the signal based on the output of said variable frequency oscillating means to said phase comparing means when said color video signal is not input, wherein said phase comparing means also serves as said phase-locked loop.

14. The television set according to claim 13, wherein said determining means includes a color killer circuit for stopping an operation of a chrominance signal processing system when a monochrome video signal is input.

* * * * *